Figure 1:
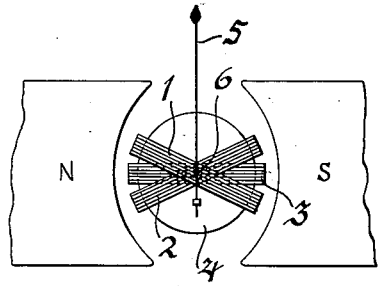

Oct. 26, 1937.   T. MORI   2,097,036

DIRECT CURRENT MEASURING INSTRUMENT

Filed March 10, 1936

Inventor

TAKEYASU MORI

By Emil Bönnelycke
Attorney

Patented Oct. 26, 1937

2,097,036

UNITED STATES PATENT OFFICE 2,097,036

DIRECT CURRENT MEASURING INSTRUMENT

Takeyasu Mori, Tokyo, Japan, assignor to Kabushiki Kaisha Hokushin Denki Seisakusho, Tokyo, Japan, a corporation of Japan Application March 10, 1936, Serial No. 68,123
In Japan July 15, 1935

3 Claims. (Cl. 171—95)

This invention relates to improvements in a direct current measuring instrument.

According to the invention, three coils are arranged in a non-uniform permanent magnetic field, the flux distribution of which is suitably selected, said three coils being fixed on a shaft provided with a pointer and two of which are adapted to be actuated by the ratio of currents through them.

When it is said that two coils are adapted to be actuated by the ratio of currents through them, it is meant that the two coils function just like two coils of cross-coil type instrument. Or more precisely, when said two coils only are supplied with a voltage and connected in opposite directions, the pointer to which these coils are mechanically connected is displaced in a direction in which the larger torque of the two coils acts, and comes to a standstill when two torques gradually approach in strength and finally balance each other owing to their displacement through a magnetic field, the strength of which changes suitably from one place to another. The position at which the pointer comes to a standstill is determined by the ratio of currents in the two coils and is not affected by the variation in the supply voltage. The current in each of the coils varies similarly, so that the ratio of such currents is not changed, and the result is that the position at which the pointer comes to a standstill remains constant. To obtain such performance of two coils, it is not always necessary that two coils are so disposed as to form the so-called cross coils.

The non-uniform permanent magnetic field in which the three coils are to be arranged may be formed by a permanent magnet by suitably shaping the pole pieces thereof, or suitably selecting the distance between them. The distribution of magnetic flux may be determined in any suitable manner. For example, the density of magnetic flux may be the highest at the central portion of the field, gradually declining toward both ends, or may be the highest at one end and gradually decreasing toward the other end.

The three coils may be arranged in any suitable manner according to the configuration of the magnetic field. All the arrangements known in the instruments heretofore can be employed. The three coils are led out by means of lead wires which possess practically no resiliency.

The measuring instruments made in conformity with this invention present various technical effects according to the model of application thereof. For example, in the case in which the two coils which function on the ratio of currents through them (in the following, for the sake of convenience two such coils will be termed cross coils) are inserted in adjacent arms of a Wheatstone bridge and the third coil is inserted in the galvanometer circuit, so that the value of a variable resistance inserted in one of the remaining arms of the bridge is indicated by the angular displacement of the said cross coils, the sensibility of the instrument may be increased by arranging the third coil in such a manner that its torque is in the same sense as the resultant displacement of the cross-coils. In this instance, when the ratio of currents in the cross coils changes, the current in the third coil changes also. Consequently, the displacement of the cross coils and the torque of the third coil act additively and in this manner the sensibility of instrument is increased.

According to another mode of application, one of the coils which does not constitute the cross-coils is inserted in the galvanometer circuit of a Wheatstone bridge, in one arm of which is inserted a variable resistance, so that the value of this resistance is indicated by the torque of the said coil in the galvanometer circuit and the cross coils are connected across the terminals of the source of electricity, the cross coils being disposed in such a manner that the torque of the coil inserted in the galvanometer circuit is controlled by the resultant torque of the cross coils. In this case, when the torque of the coil in the galvanometer circuit changes due to variation in the supply voltage, the resultant torque of the cross coils will change similarly. That is, the cross coils will exert upon the coil in the galvanometer circuit a controlling force which changes in conformity with the torque of the latter. As the result, the variation in the supply voltage has no effect on the indication of the instrument. Measurement therefore can be carried out independently of any variation in the supply voltage.

Figure 3:
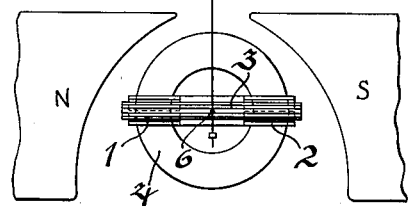
Figure 4:
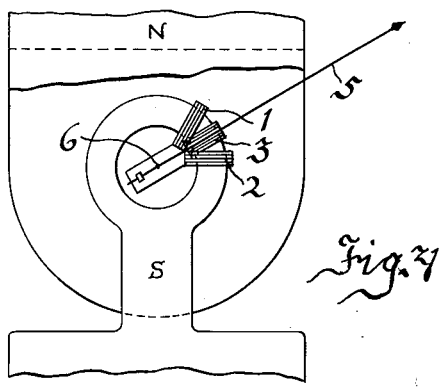
Figure 5:
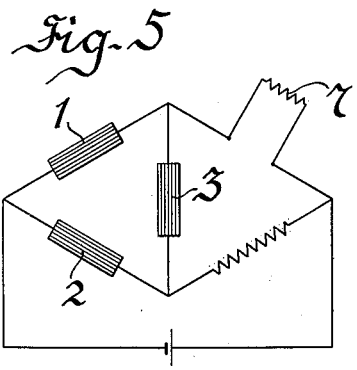
Figure 6:
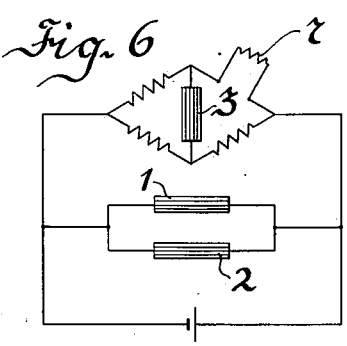

The invention will now be explained with reference to the accompanying drawing, in which:

Figs. 1 to 4 show embodiments of the present invention, and Figs. 5 and 6 show the electrical connections of two modes of applications of the instruments according to the invention.

Referring to Fig. 1, coils 1, 2, and 3 are wound around an iron core 4 disposed between the pole pieces of a permanent magnet so as to form between it and the said pole pieces non-uniform air gaps. The coils 1 and 2 constitute cross coils and are mounted on the shaft 6 of a pointer 5, together with the third coil 3. In the embodiment shown, all the three coils are arranged so as to be on different diameters of the core. The coil 3, however, may be wound as superposed on one of the coils 1 and 2.

Figure 2:

In the embodiment shown in Fig. 2, an iron core 4 is in the form of a ring and the coils 1 and 2 are wound on it at diametrically opposite position, and the coil 3 is laid over the two coils 1 and 2. The pole pieces of the permanent magnet are so shaped that the distance between them is larger at one end than at the other, and the iron core 4 is arranged closely to the narrower end of the gap. The coil 3 may be wound, if desired, only on one of the coils 1 and 2. Although the coils 1 and 2 in this embodiment do not constitute so-called cross coils, the force from coil 1 tends to turn the armature 4 or pointer 5 in a direction opposite to the force exerted by the coil 2.

In the embodiment shown in Fig. 3, one of the pole pieces of the permanent magnet has a circular recess opening outwardly at one end thereof, and the other has a ring-shaped portion at its end, which penetrates into the said circular recess in an eccentric fashion. Within the non-uniform magnetic field formed by such pole pieces, shaft 6 is disposed at the centre of the said ring-shaped portion, and the coils 1, 2, and 3 which are fixed to the said shaft are wound substantially radially in different radial planes on the ring-shaped portion. The coil 3 may be wound, if desired, over one of the coils 1 and 2. Coils 1, 2, and 3 are wound around and spaced from the ring-shaped pole while fixed to shaft 6 through the intermediary of an elongated rectangular (more exactly pentagonal) piece, or through any suitable piece.

In the embodiment shown in Fig. 4, one of the pole pieces of the permanent magnet is bifurcated and has a recess, whose bounding surface is U-shaped, the recess opening outwardly at one end thereof. The other pole piece has a ring-shaped end portion, which is so arranged that its median plane coincides with the median plane of the recess. The thickness of the ring-shaped portion is reduced gradually toward the end. In the non-uniform magnetic field formed by such pole pieces, the three coils are wound on the ring-shaped portion in different radial planes. The pole pieces shown in Figure 4 may be derived from those of the device shown in Fig. 3 by rotating by ninety degrees one of the pole pieces which is formed with a circular recess and by modifying the other pole in such a manner that its thickness decreases gradually toward the end. In this case too the coil 3 may be superposed over one of the coils 1 and 2. Also, coils 1, 2, and 3 are wound around and spaced from the ring-shaped pole while fixed to shaft 6 through the intermediary of an elongated rectangular (more exactly pentagonal) piece, or through any suitable piece.

From the three coils 1, 2, and 3, as above described, lead wires with practically no resiliency may be led out and the ends thereof may be connected to any desired circuit.

It is not absolutely necessary to arrange the coil 3 in the same magnetic field as the coils 1 and 2 are. While the coils 1 and 2 must be arranged in a non-uniform magnetic field, the coil 3 may be arranged in the same or in a separate field. In the latter case, it may be non-uniform or uniform field. All the three coils, 1, 2, and 3, however, must be fixed on the same shaft.

Figs. 5 and 6 show two modes of application of the instrument made according to this invention. In these figures, the numerals 1, 2, and 3 indicate the coils corresponding to those in the realizations above referred to.

In reference to the electrical connection shown in Fig. 5, it is well known, for example, in a pyrometer in which a cross coil type meter is used in conjunction with a connection similar to Fig. 5, but which is not provided with the galvanometer circuit including the coil 3, to measure the variation of a variable resistance 7 by measuring the torque of the cross coils composed by the coils 1 and 2. By adding the circuit including the coil 3, the coils 1 and 2, the variable resistance 7 and another suitable resistance make up a Wheatstone bridge in which the coil 3 constitutes the galvanometer circuit. In such connection, as shown in Fig. 5, any variation in the value of resistance 7 brings about corresponding changes in the currents through the coils 1, 2, and 3. If these coils are arranged in such a manner that the displacement due to the resultant torque of the coils 1 and 2 and the torque of the coil 3 are directed in the same sense, the pointer 5 will be operated by the sum of the two torques above referred to, and a small variation in the resistance 7 will produce a relatively large displacement of the pointer 5. It will thus be seen that the sensibility of an instrument can be increased by the invention.

Finally, referring to Fig. 6, the coil 3 is connected, in this instance, in the galvanometer circuit of a Wheatstone bridge including a variable resistance 7 in an arm, and is adapted to indicate the variations in the value of the said resistance. The coils 1 and 2 are connected in parallel to the source of electricity. These coils 1 and 2 may be connected, if desired, in series. The variation in the electromotive force of the source affects the coil 3 and the coils 1 and 2 in a similar manner. The coils 1 and 2, which are connected in series or in parallel to each other, or cross coils or the like, and are actuated by a constant current ratio which is independent of the variations in the voltage of source, so that in case the coil 3 exerts no torque, the coils 1 and 2 tend to maintain the pointer 5 at zero position. That is, the torque of the coil 3 is controlled by the resultant torque due to the coils 1 and 2. In other words, the coils 1 and 2 act as a controlling spring. The controlling action as well as the torque of the coil 3 vary when the voltage of the source varies, so that the displacement of the pointer is maintained independent of the change in voltage, and the pointer is displaced only by the variation in the value of the resistance 7. In this manner, it is possible, by using the instrument made according to this invention, to eliminate the effect of the variation in the voltage of source.

The instrument according to the present invention, of course, can be applied to other purposes.

It will be understood that the invention is not limited in any way by the embodiments referred to. On the contrary, it can be modified in any manner, as far as it does not depart from the spirit of the invention.

What I claim is:

1. A direct current measuring instrument, comprising means for producing a permanent magnetic field of a non-uniform flux distribution, a shaft mounted for rotation in said magnetic field, said shaft having three relatively fixed coils and a pointer secured thereto, a Wheatstone bridge with two of its adjoining arms containing, respectively, two of the said coils which are actuated by a force which depends upon the ratio of currents through them, said Wheatstone bridge having a variable resistance in one of its arms, and the remaining coil being connected in the galvanometer circuit of the said bridge.

2. A direct current measuring instrument, comprising means for producing a permanent magnetic field of a non-uniform flux distribution, a shaft mounted for rotation in said magnetic field, said shaft having three relatively fixed coils and a pointer secured thereto, a Wheatstone bridge having a variable resistance in one of its arms, two of the said coils which are actuated by a force which depends upon the ratio of currents through them, being connected across a source of electricity of said Wheatstone bridge, and the remaining coil being connected in the galvanometer circuit of the said bridge.

3. A direct current measuring instrument, comprising means for producing a permanent magnetic field of a non-uniform flux distribution, a shaft mounted for rotation in said magnetic field, said shaft having three relatively fixed coils and a pointer secured thereto, a Wheatstone bridge having a variable resistance in one of its arms, two of said coils which are actuated by a force which depends upon the ratio of currents through them being associated, in parallel with each other, with said Wheatstone bridge, and the remaining coil being connected in the galvanometer circuit of said bridge.

TAKEYASU MORI.